(12) United States Patent
Rubanenko et al.

(10) Patent No.: US 9,144,206 B1
(45) Date of Patent: Sep. 29, 2015

(54) SOIL-FREE CULTIVATION SYSTEM

(71) Applicant: Agroinnovations, LLC, Los Angeles, CA (US)

(72) Inventors: Gabriel Rubanenko, Beverly Hills, CA (US); Valentin Hilitsky, Hollywood, CA (US)

(73) Assignee: AGROINNOVATIONS, LLC, Los Angeles, CA (US)

( * ) Notice: Subject to any disclaimer, the term of this patent is extended or adjusted under 35 U.S.C. 154(b) by 127 days.

(21) Appl. No.: 14/179,055

(22) Filed: Feb. 12, 2014

Related U.S. Application Data

(63) Continuation-in-part of application No. 14/109,595, filed on Dec. 17, 2013, now abandoned, which is a continuation of application No. 13/894,427, filed on May 14, 2013, now abandoned, which is a continuation-in-part of application No. 13/710,446, filed on Dec. 10, 2012, now abandoned.

(60) Provisional application No. 61/568,873, filed on Dec. 9, 2011.

(51) Int. Cl.
*A01G 31/00* (2006.01)
*A01G 31/02* (2006.01)

(52) U.S. Cl.
CPC ..................... *A01G 31/02* (2013.01)

(58) Field of Classification Search
CPC ....... A01G 31/00; A01G 31/02; A01G 31/06; A01G 27/00; A01G 27/02
See application file for complete search history.

(56) References Cited

U.S. PATENT DOCUMENTS

| | | | | |
|---|---|---|---|---|
| 4,324,069 A | * | 4/1982 | Flagg | 47/62 E |
| 2009/0126269 A1 | * | 5/2009 | Wilson et al. | 47/62 R |

FOREIGN PATENT DOCUMENTS

| | | |
|---|---|---|
| JP | 2011160789 A | 8/2011 |
| RU | 86396 U1 | 9/2009 |
| RU | 2009133405 A | 3/2011 |
| SU | 1755740 A1 | 8/1992 |

OTHER PUBLICATIONS

International Search Report & Written Opinion for PCT/US14/36467, dated Oct. 30, 2014; 8 pages.

* cited by examiner

*Primary Examiner* — Monica Williams
*Assistant Examiner* — Aaron Rodziwicz
(74) *Attorney, Agent, or Firm* — Michael Fedrick; Loza & Loza, LLP

(57) ABSTRACT

A cultivation system made up of multiple units, with each unit having an upper root compartment, a lower solution compartment, and a base. A growing solution is conducted into each unit via a supply conduit in the base and sprayed into the root compartment, after which it is drained into the solution compartment and then into drain conduits in the base.

17 Claims, 15 Drawing Sheets

SOIL-FREE CULTIVATION SYSTEM

CROSS-REFERENCE TO RELATED APPLICATIONS

The present application is a continuation-in-part of U.S. patent application Ser. No. 14/109,595, filed Dec. 17, 2013, which is a continuation of U.S. patent application Ser. No. 13/894,427, filed May 14, 2013, which is a continuation-in-part of U.S. patent application Ser. No. 13/710,446, filed Dec. 10, 2012, which is a non-provisional of U.S. Patent Application No. 61/568,873, filed Dec. 9, 2011. The present application claims the benefit of priority under 35 U.S.C. §120 from the foregoing applications, and the disclosures of the foregoing applications are incorporated herein by reference in their entirety.

BACKGROUND

Soil-free systems for growing plants include hydroponic systems and aeroponic systems. In hydroponic systems, the roots of cultivated plants are suspended in a nutrient solution, while in aeroponic systems plant roots are generally suspended in the air and provided with a nutrient solution by spraying. Both types of systems avoid the use of soil or an aggregate medium.

The basic principle of aeroponic growing is to grow plants suspended in a closed or semi-closed environment by spraying the plant's roots and lower stem with an atomized or sprayed, nutrient-rich aqueous solution. The leaves and crown of growing plants extend above the roots, and for larger plants, trellising is used to suspend the weight of vegetation and fruit.

Both hydroponic and aeroponic systems, however, have disadvantages, including cost, scalability, and limitations on the variety of plants that can be cultivated. In view of the shrinkage of arable land in the world and significant population growth, improved soil-free cultivation methods are needed.

SUMMARY

The present invention comprises a modified aeroponic growing unit and system, termed the ECOPOD cultivation system, in which a plant's roots are provided with a nutrient solution within a housing, without the use of a solid medium such as soil or aggregate. In one embodiment, the present invention comprises a cultivation unit for growing plants which includes a base, a solution compartment above the base, and a root compartment above the solution compartment. The base supports the solution compartment and provides fluid access to a drain and a source of a solution for watering and/or feeding the roots of a plant retained in the cultivation unit. Preferably, the base comprises a pair of drain conduits, each one having a drain hole in an upper surface of the drain conduit for communicating with the interior of the drain conduit. An outlet of the solution compartment preferably communicates through each drain hole, such as with a downwardly extending, hollow, male connector adapted to fit into the drain holes of the base in order to the solution to the base and allow for fluid communication between the interior of the solution compartment and the interior of each of the drain conduits. The base further includes a supply conduit having an outlet at its upper end which is preferably positioned between the pair of drain conduits. At least one connecting wall preferably extends between the pair of drain conduits and is further attached to the outer surface of the supply conduit in order to stabilize the base.

In this embodiment, the solution compartment positioned above the base includes vertically extending sidewalls, an upper opening, and a bottom with at least one outlet in communication with one of the pair of drain conduits and an inlet in communication with the outlet of the supply conduit. Preferably, the bottom of the solution compartment comprises two outlets, one outlet in communication with each of the pair of drain conduits, and a plug is fitted into one of the outlets in order to prevent the passage of fluid from the solution compartment. The exterior portions of the sidewalls of the solution compartment are further preferably provided with one or more sockets for receiving outwardly extending supports, which can be straight, bent, or in any convenient configuration for supporting the branches of a plant being grown in the cultivation unit.

The solution compartment further includes an interior drain pipe having a proximal end, a distal end, and a medial portion disposed above the proximal and distal ends. One end of the interior drain pipe is in fluid tight engagement with the drain hole of the drain conduit while the other end remains open to the interior of the solution compartment and is maintained at a level higher than the connected end. The medial portion of the drain pipe is disposed higher than the proximal and distal ends, so that fluid from the interior of the solution compartment enters the fluid opening in the open end of the drain pipe and exits through the other end when an upper surface of a fluid in the solution compartment reaches the vertex of the drain pipe.

A riser pipe is also provided in the present cultivation unit in order to conduct fluid from the supply conduit into the interior of the cultivation unit. The lower end has a lower opening in fluid communication with the supply conduit, and the upper end has a nozzle with openings to allow the passage of fluid therethrough. Preferably, the lower end of the riser pipe comprises threads for engagement with corresponding grooves in the supply opening of the solution compartment and/or in the exit opening of the supply conduit in order to reversibly secure the riser pipe to the bottom of the solution compartment and place the riser pipe in fluid communication with the supply conduit. The upper end of the riser pipe extends through the lower opening of the root compartment and into the interior of the root compartment.

The root compartment of the present cultivation unit is supported on the upper end of the solution compartment and has a circumferential wall between its upper and lower ends as well as a lower opening. The circumferential wall comprises one or more stem openings, each having an opening to allow a portion of a plant being grown in the compartment to pass therethrough, thereby retaining the roots of the plant in the root compartment but allowing the stem and branches of the plant to grow outside the unit. The stem openings preferably include a moisture barrier material between the plant and the interior surface of the stem opening in order to prevent loss of moisture from the root compartment. Preferably, the sidewall of the root compartment extends vertically upward and outward from the lower end of the root compartment. In addition, the root compartment preferably further includes one or more circumferential walls extending upwardly from the interior surface of the root compartment, the circumferential walls providing support for roots growing within the root compartment. The root compartment further includes a cover, which preferably includes a central portion having a lower concave surface.

The present cultivation unit further generally includes a filter, preferably tubular in shape, which is attached to the lower opening of the root compartment. The filter preferably has circumferential walls extending upwardly from its lower end, and the filter walls have openings to allow the passage of fluid therethrough, such that fluid in the lower end of the root compartment drains into the solution compartment through the filter. The filter walls preferably comprise openings having a width of between 10 and 20 microns to allow a flow of solution therethrough.

In a particular embodiment, the present cultivation unit comprises:

(a) a base, the base comprising:

a pair of tubular drain conduits, each conduit having a proximal end, a distal end, an upper surface, a lower surface, a medial side, a lateral side, and an opening in each of the proximal end and distal end, the drain conduits each further comprising a drain hole in an upper surface of the drain conduit, the drain hole being in communication with an interior of the drain conduit;

a tubular supply conduit positioned between the pair of drain conduits, the supply conduit having a proximal end, a distal end, an upper surface, a lower surface, two lateral sides and an opening in each of the proximal end and distal end, wherein each lateral side of the supply conduit is attached to a respective medial side of one of the drain conduits, the supply conduit further comprising an inlet pipe extending upwardly from the upper surface of the supply conduit, the inlet pipe having an exit opening and being in communication with an interior of the supply conduit;

a proximal connecting wall extending between the pair of drain conduits at the proximal end of each conduit, and attached to the medial side of each respective drain conduit, wherein a lower end of the proximal connecting wall further attaches to the upper surface of the proximal end of the supply conduit; and a distal connecting wall extending between the pair of drain conduits at the distal end of each conduit, and attached to the medial side of each respective drain conduit, wherein a lower end of the distal connecting wall further attaches to the upper surface of the distal end of the supply conduit;

(b) a solution compartment, the solution compartment comprising:

an upper end, a lower end, vertically extending sidewalls, an upper opening, and a bottom, the bottom comprising first and second downwardly extending, hollow, male connectors adapted to fit into the drain holes of the base, thereby securing the solution to the base and allowing for fluid communication between the interior of the solution compartment and the interior of each of the drain conduits, wherein a plug is fitted into the first male connector in order to prevent the passage of fluid between the solution compartment and the drain conduit, and the bottom further comprising a supply opening in fluid communication with the inlet pipe of the supply conduit, the solution compartment further comprising one or more sockets for receiving laterally extending supports for exterior portions of plants being grown in the cultivation unit;

(c) an interior drain pipe having a proximal end, a distal end, and a medial portion, the proximal end and distal end having fluid openings, the proximal end further being in fluid tight engagement with the second male connector, wherein the distal end of the drain pipe is disposed higher than the proximal end, and wherein the medial portion of the drain pipe is disposed higher than the proximal and distal ends and includes a vertex, and wherein fluid from the interior of the solution compartment enters an opening in the distal end of the drain pipe and exits through an opening in the proximal end of the drain pipe when an upper surface of a fluid in the solution compartment reaches the vertex of the drain pipe;

(d) a riser pipe having an upper end with an upper opening and a lower end with a lower opening, the lower end comprising threads for engagement with corresponding threads in the supply opening of the solution compartment and in the exit opening of the supply conduit, thereby placing the riser pipe in fluid communication with the supply conduit, the lower end further comprising a circumferential flange having an upper surface and a lower surface, wherein the lower surface is in contact with the lower surface of the interior of the solution compartment when the riser pipe is in threaded engagement with the supply opening of the solution compartment and in the exit opening of the supply conduit, the upper end being adapted to engage an opening in a lower end of a nozzle, the upper end of the nozzle comprising nozzle openings to all the passage of fluid therethrough, the upper end further comprising threads for engaging a nozzle connector, the nozzle connector comprising an opening having grooves for engaging the threads of the upper end of the nozzle, the nozzle further comprising a circumferential, upwardly extending wall, wherein the interior surface of the upwardly extending wall is adapted to engage the exterior surface of a lower portion of the nozzle in order to secure the nozzle to the riser pipe;

(e) a root compartment having an upper end, lower end, exterior surface, interior surface, upper opening, and lower opening, the root compartment comprising:

a downwardly extending circumferential wall having a lower surface, wherein the lower surface of the downwardly extending circumferential wall contacts an upper surface of the solution compartment in order to support and retain the root compartment on the solution compartment;

a sidewall extending vertically upward and outward, the sidewall comprising one or more stem openings, each stem opening having a proximal end, a distal end, an interior surface, and a passage therethrough, the stem opening further including a moisture barrier material in contact with the interior surface, one or more circumferential walls extending upwardly from the interior surface of the root compartment and having an upper end and a lower end, a cover for the root compartment having an upper surface and a lower surface, the upper surface including a handle, wherein a central portion of the lower surface of the cover has a concave shape, and wherein a center part of the central portion of the lower surface of the cover has a concave shape; and (f) a filter, the filter having an upper end and a lower end and being tubular in shape, the filter comprising an inner piece and an outer piece, the inner piece comprising a plurality of vertically oriented flanges extending between the upper end of the filter and the lower end of the filter around its periphery, each flange comprising (i) a radially extending portion which extends radially away from the center of the filter, and (ii) a medial portion at the radially distal end of the radially extending portion, the medial portion extending perpendicularly to the radially extending portion, the outer piece comprising a plurality of vertically oriented flanges extending between the upper end of the filter and the lower end of the filter around its periphery, each flange comprising (i) a radially extending portion which extends radially toward the center of the filter, and (ii) a medial portion at the radially distal end of the radially extending portion, the medial portion extending perpendicularly to the radially extending portion, wherein the inner piece fits within the outer piece such that a lower surface of the medial portion of the flange of the inner piece faces a lower surface of the medial portion of the flange of the outer piece, leaving a gap between the flanges of between 10 and 20 microns to allow a flow of solution therethrough.

A plurality of the present cultivation units can advantageously be used together and form a cultivation system. Each of the pair of drain conduits of a particular unit can be attached to a respective drain pipe at one end of the drain pipe, and at the other end of the drain pipe a drain conduit of a second cultivation unit can be connected. Likewise, the supply conduit of the first cultivation unit can be attached to a supply pipe, and the supply pipe can be attached at its other end to the supply conduit of the second cultivation unit. Cultivation units can be attached this way in series, thereby allowing the connected units to share a common supply of fluid and a common drain.

FIGURES

DESCRIPTION

Definitions

As used herein, the following terms and variations thereof have the meanings given below, unless a different meaning is clearly intended by the context in which such term is used.

"Conduit" and "pipe" refer to enclosed channels, preferably tubular, for conducting fluids therethrough and having an opening at least at one end, preferably at both ends of the conduit.

"Crown" refers to the portions of a plant other than the roots, including stems, leaves, and reproductive structures, which are primarily located outside the root chamber of the present cultivation system.

"Downward" and "downwardly" mean in the direction of or toward a support surface on which the present apparatus is or can be positioned. "Upward" and "upwardly" mean in the opposite direction, i.e. away from such a support surface.

"Elongated" refers to a configuration or shape having a length which is longer than its width.

"Horizontal" refers to an orientation approximately parallel to (i.e., not substantially extending toward or away from) a support surface on which the present apparatus is supported when in use.

"Lower" and "below" refer to the relative position of a component of the present apparatus which is closer to or toward a support surface on which the present apparatus is or can be positioned.

"Nozzle" refers to a projecting conduit with an opening for regulating and/or directing a flow of fluid.

"Outward" and "outwardly" mean in a direction away from the horizontal or vertical center of the apparatus or of a component part of the apparatus.

"Perennial" refers to a plant that lives for more than two years. Perennials typically grow and bloom over the spring and summer and then die back in the autumn and winter, after which they grow back in the spring from their root-stock.

"Screen" refers to a component of the present device for dividing one compartment from another. A screen in the present unit can allow fluids to pass therethrough.

"Upper" and "above" refer to the relative position of a component of the present apparatus which is further from or away from a support surface on which the present apparatus can be placed.

"Vertex" refers to the portion of a component located higher than the other portions of the component when disposed in the present device.

"Vertical" refers to an orientation extending toward or away from a support surface on which the present apparatus is supported when in use.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Cultivation System

Freestanding Cultivation Unit

Figure 1:
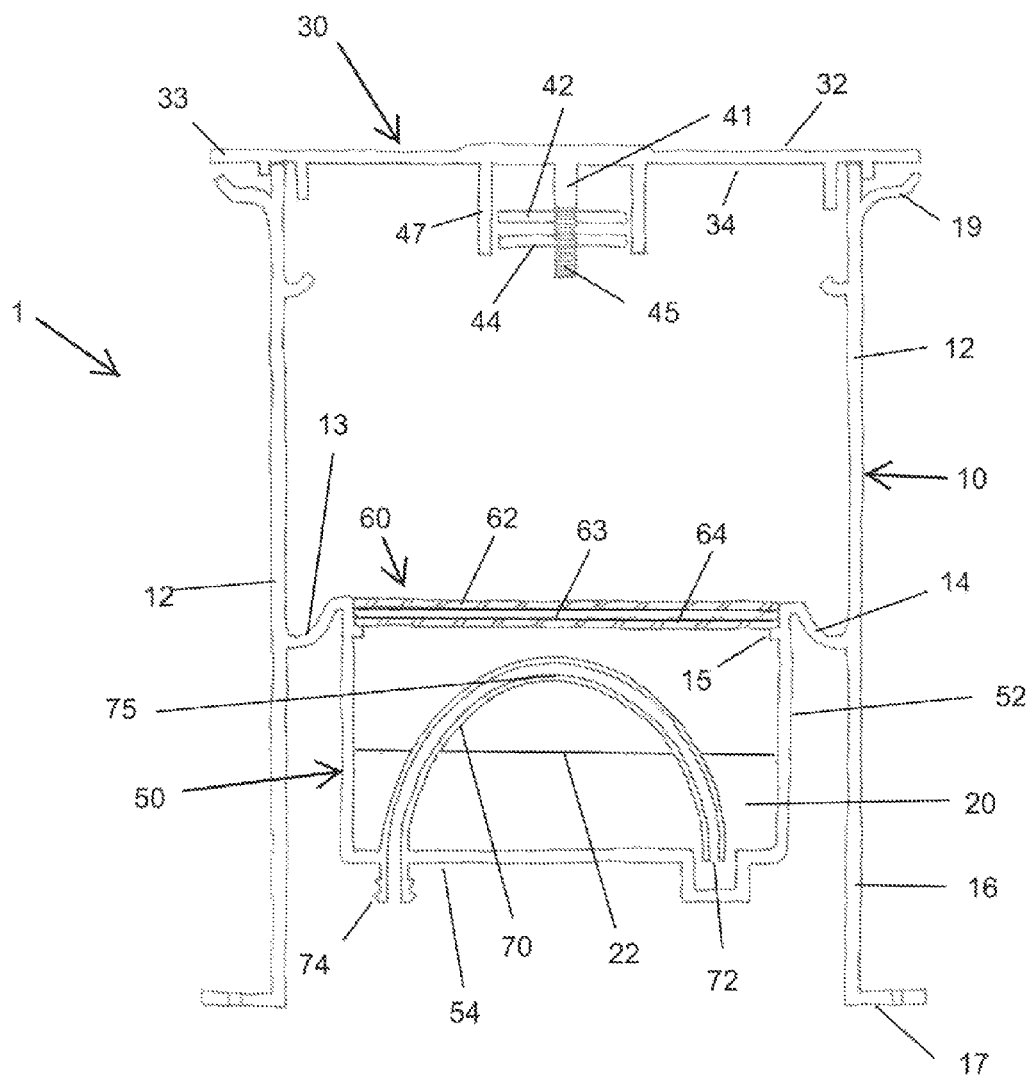
FIG. 1 is a sectional view of an embodiment of a cultivation unit for use in the present cultivation system.
Figure 2:
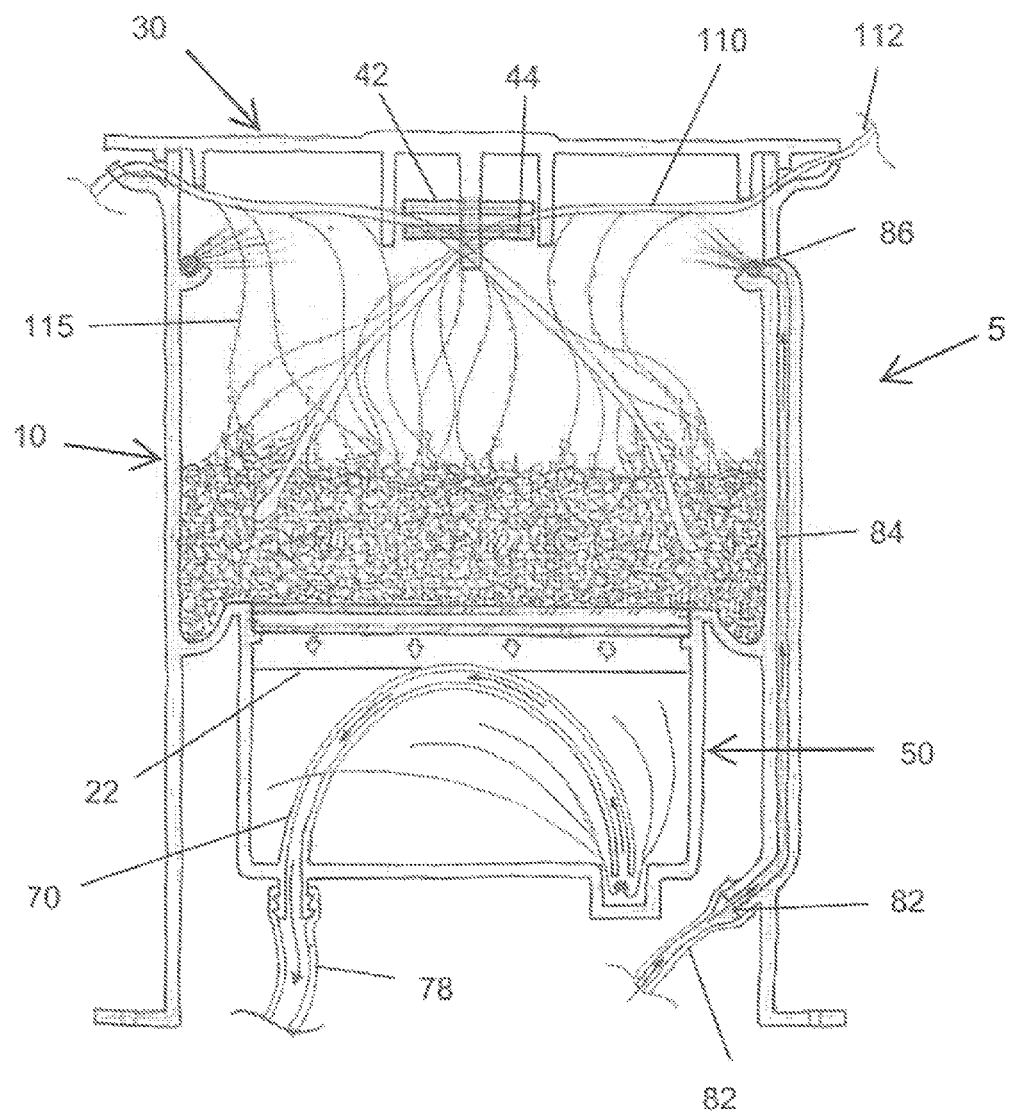
FIG. 2 is a sectional view of the cultivation system of FIG. 1 growing plants.

In the present cultivation system, a plant's roots are suspended above a reservoir of nutrient solution or inside a channel connected to a reservoir. In one embodiment, as shown in FIGS. 1 and 2, the present system 1 comprises a cultivation unit 5 which comprises a root compartment 10, a cover 30 for the root compartment, and a solution compartment 50. The root compartment generally comprises vertically extending sidewalls 12 and a generally horizontal bottom 14. In the embodiment shown in FIGS. 1 and 2, the bottom 14 comprises an opening 15 leading to a solution compartment 50 positioned generally below the root compartment 10. A screen 60 separates the root compartment 10 and the solution compartment 50.

Although the embodiment of FIGS. 1 and 2 depict the present unit is depicted as comprising a root compartment 10 having an interior with an approximately square horizontal cross section, in a preferred embodiment, however, the root compartment 10 has a rounded interior cross section. In addition, the perimeter of the bottom 14 of the interior of the root compartment 10 preferably includes a groove 13. When new, more aggressive roots expand to the periphery of the root compartment, they will tend to grow downward into the groove 13 around the periphery of the container. As newer, thinner roots grow on top of the older roots in the groove, they spread along the bottom of the root compartment 10 to eventually fill the root compartment 10.

In this embodiment, the root compartment 10 of the cultivation unit 5 is supported above a support surface (such as the ground or a floor) by legs 16 and feet 17, although other means for mechanically supporting the root compartment 10 on or above a support surface can also be used. The legs 16 extend vertically upward from the support surface by a distance sufficient to accommodate the solution compartment 50 below the root compartment 10, and preferably by a distance allowing the solution compartment 50 to be suspended above the support surface. The solution compartment 50 in these embodiments comprises vertically extending sidewalls 52 and a bottom 54, although other configurations of the solution compartment 50 can also be used.

The cover 30 generally comprises an upper surface 32, a lower surface 34, and a rim 33 extending horizontally beyond the width and/or depth of the root compartment in order to retain the cover 30 on top of the root compartment 10. The underside of the cover 30 includes a central stem support 41 extending vertically downward from the lower surface 34 of the cover 30. Attached to this central stem support 41 are two horizontally extending stem supports (42, 44) for securing a stem portion of a plant. When a stem of a plant is placed in between the upper horizontal support 42 and the lower horizontal support 44, the two horizontal supports are moved vertically closer to each other and preferably placed in contact with the stem, i.e. such that the lower surface of the upper horizontal stem support 42 and the upper surface of the lower horizontal stem support 44 are in contact with the stem. This can be accomplished, for example, by providing the horizontal stem supports (42, 44) with a central opening comprising grooves that engage threads 45 on the central stem support 41.

Preferably, the horizontal stem supports comprise a plurality of circumferentially and horizontally extending flanges 43, for example in the shape of petals, but other shapes can also be used. The flanges 43 are also preferably not formed from a rigid material, but are at least partly elastic, and further preferably include a rough and or otherwise gripping surface. This allows the flanges 43 to maintain a stem in position once they contact a stem, but also helps to prevent damaging the stem.

The lower surface 34 of the cover 30 also preferably further comprises vertically extending stem supports 47 located horizontally outward from the distal extent of the flanges 43. The vertically extending stem supports 47 help to further retain a stem by limiting the horizontal movement or placement of that stem.

FIG. 2 illustrates the placement of two stems 112 between the upper horizontal stem support 42 and lower horizontal stem support 44. As can be seen in that figure, the upper end of the stem 112, i.e. the portion extending to the crown of the plant, extends outside the cultivation unit 5 through an opening, and is preferably supported by a stem support 19, while the lower portion of the stem grows roots 115 that extends downwardly to the bottom 14 of the root compartment 10.

FIG. 2 further illustrates the circulation of a nutrient solution for growing a plant in the present cultivation unit. A low-pressure pump (not shown) delivers nutrient solution through a fluid supply conduit 80 to an inlet 82 of a solution conduit 84 which transports the solution to the interior of the root chamber 10. The outlet 86 of the solution conduit 84 can include one or more jets or ultrasonic transducers for dispersing the nutrient solution as a spray or mist, which is then delivered to the roots 115 on the interior of the root chamber 10. Alternatively, the nutrient solution can be delivered as a mist generated by high-pressure pumps.

After contacting and/or condensing on the roots of plants in this embodiment of the cultivation unit 5, the nutrient solution then drips or drains back into the solution compartment 50 through the screen 60. The nutrient solution 20 in the solution compartment 50 is then recirculated through a curved drain conduit 70 in the solution compartment 50. After, e.g., 3-4 applications of the nutrient solution, the solution level in the solution compartment 50 increases and triggers a simple-design overflow system. The solution is abruptly discharged into the drainage conduit 70, while simultaneously causing air to be sucked out through the grating structure and away from the roots. This allows fresh air to be supplied through the cover 30, allowing plant roots to be regularly supplied with nutrients and oxygen.

As shown in FIG. 1, when the fluid level 20 of the nutrient solution 20 is below the apex 75 of the drain conduit 70, the nutrient solution 20 will remain in the solution compartment 50 and will not drain out of the solution compartment 50 through the outlet 74 of the drain conduit 70. As shown in FIG. 2, however, when the fluid level 22 reaches the apex 75 of the fluid conduit 70, the nutrient solution 20 will flow through the inlet 72 of the drain conduit 70 and then will drain through the outlet 74 and into a conduit 78 which is in fluid communication with the fluid supply conduit 80. In this way, nutrient solution which is sprayed onto the roots of a plant can be recirculated. As can be seen in FIGS. 1 and 2, the drain conduit 70 is located below the lower surface of the screen 60 so that the fluid level 22 does not rise above the screen. The roots of a plant in the root chamber will thereby be prevented from becoming submerged in the nutrient solution, thus preventing root rot.

In this embodiment of the present cultivation unit 5, a screen 60 separates the root compartment 10 from the solution compartment 50. The screen 60 comprises a plurality of layers 61 of a porous material which is permeable to air and to aqueous solutions. The layers 61 of the screen 60 can comprise a mesh or any other material comprising pores which allowed the nutrient solution to drain from the root compartment 10 into the solution compartment 50. The pores or openings of the screen material are preferably smaller than the roots of the plants intended to be used with the present cultivation unit 1.

Figure 3:
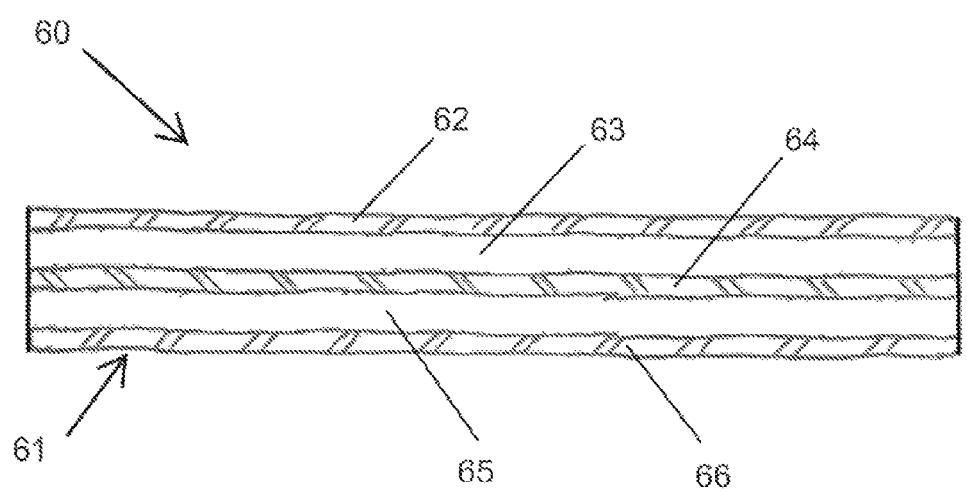
FIG. 3 is a sectional view of a screen for use with the cultivation unit of FIG. 1.
Figure 4:
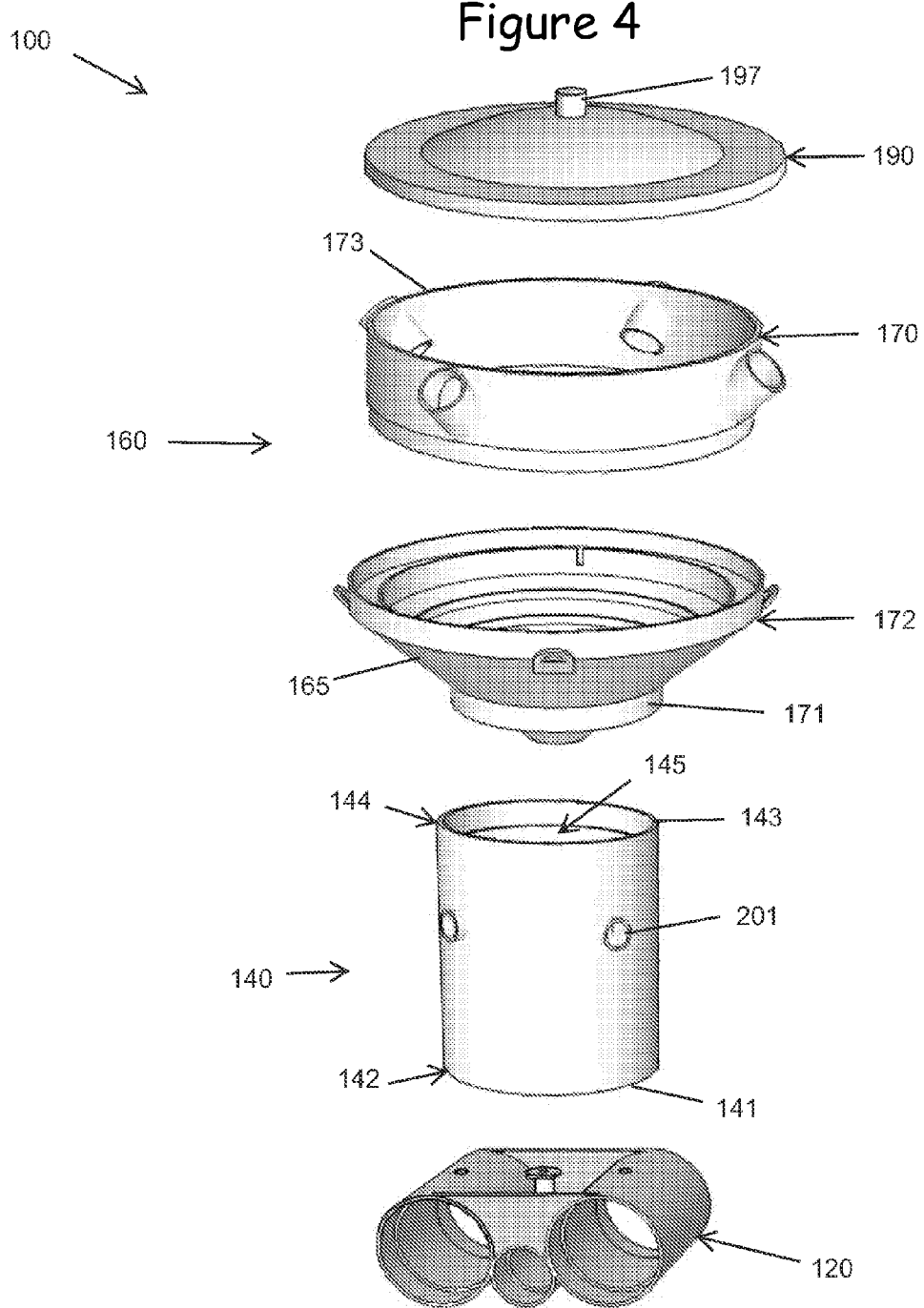
FIG. 4 is an exploded view of the primary components of another embodiment of a cultivation unit for use in the present cultivation system.

As shown in FIG. 3, between each horizontal layer 61 of porous material of the screen 60 is an open space. Preferably, there is between about 1 and 3 millimeters of space between the lower surface of a first, upper layer 62 and the upper surface of a second, lower layer 64 of porous material. Maintaining a space between such porous layers is important because if a root of the plant in the root chamber 10 manages to extend through a pore of the uppermost porous layer 62, it will not continue to grow through the porous layer because it comes into contact with the air of the intermediate space 63 between the uppermost porous layer 62 and a lower porous layer 64 of the screen 60. The air of the intermediate space 63 inhibits the further growth of such a root into the screen 60, and instead directs the root to grow in a different direction. This prevents the screen 60 from becoming clogged with roots growing through its pores. In view of the advantage of maintaining an air space between the porous layers of the screen 60, it is preferred that the porous layers be formed from a relatively rigid material. In one embodiment, this material is a polyvinyl plastic. When the porous layers are formed from a rigid material, they do not need to be generally planar as shown in FIGS. 1 and 2.

In a preferred embodiment of the screen 60 illustrated in FIG. 3, the screen 60 comprises an upper porous layer 62, an intermediate porous layer 64, and a lower porous layer 66. A first intermediate space 63 is maintained between the upper layer 62 and intermediate layer 64, and a second intermediate space 65 is maintained between the intermediate porous layer 64 and a lower porous layer 66.

Modular Cultivation System

Figure 5:
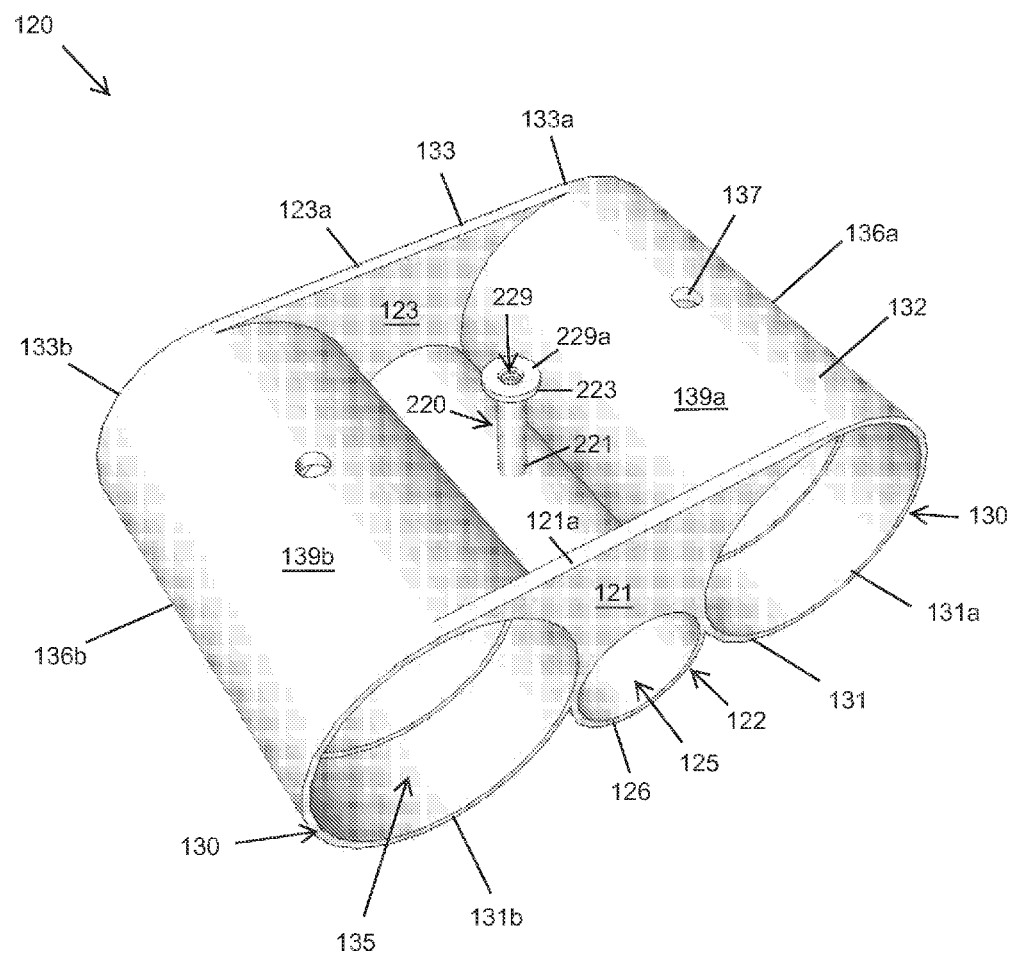
FIG. 5 is a perspective view of the base of the unit of FIG. 4.
Figure 6:
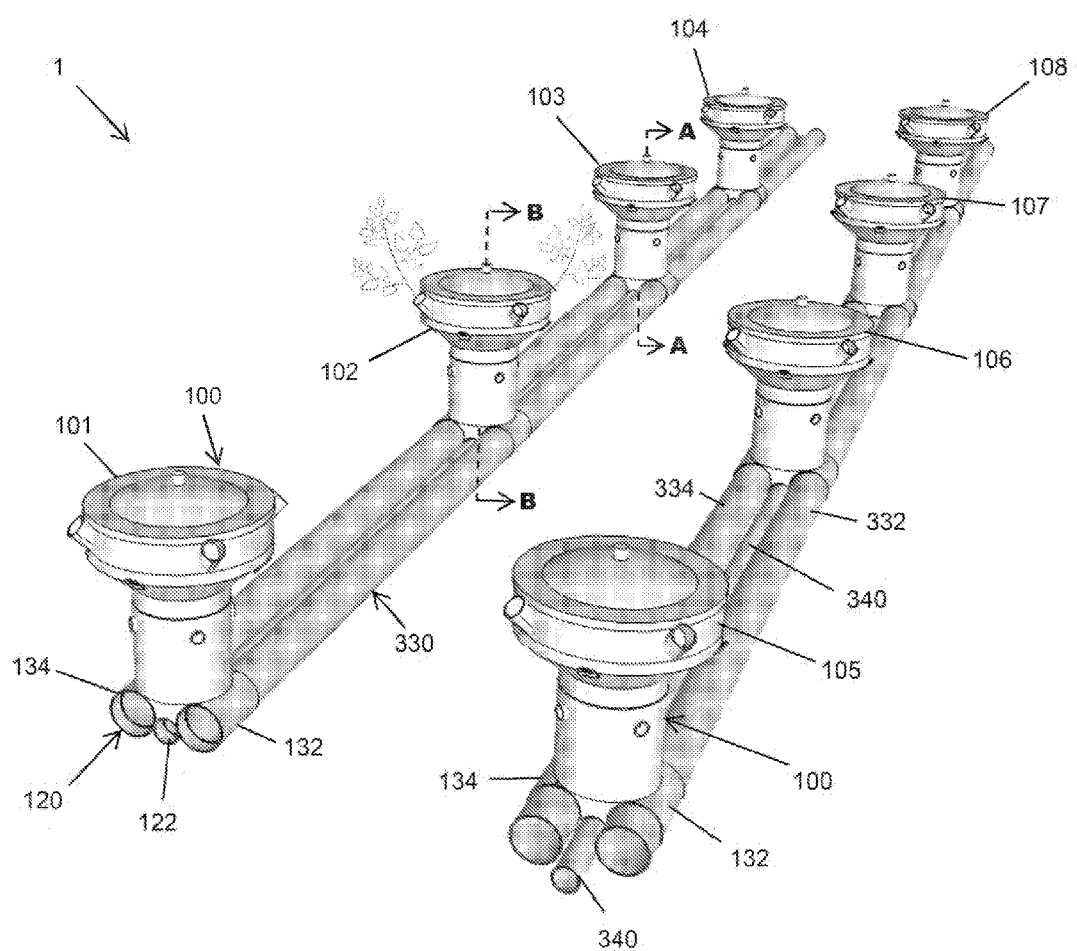
FIG. 6 is a perspective view of a cultivation system comprising a plurality of the cultivation units of FIG. 4 connected in series.

In another embodiment of the present cultivation system 1, shown in FIGS. 4-15, the present system comprises a cultivation unit 100 which preferably comprises a base 120, a solution compartment 140, and a root compartment 160. The cultivation unit 100 can be used individually, but preferably is used together with other units 100 in a modular fashion, as shown in FIG. 6. Although other means for mechanically supporting the root compartment 160 and/or the solution compartment 140 on or above a support surface (such as the ground or a floor) can be used, in a preferred embodiment the base 120 comprises one or more drain conduits 130 and at least one supply conduit 122. These conduits, in particular the drain conduits 130, can provide structural support to the present cultivation unit 100 in addition to providing fluid flow and drainage.

In a preferred embodiment, best seen in FIG. 5, the base 120 comprises a pair of parallel drain conduits 132, 134, preferably of the same diameter, at respective lateral ends 136a and 136b of the base 120. The proximal end 131a of drain conduit 132 is preferably mechanically connected to the proximal end 131b of drain conduit 134 by a connecting wall 121 extending between them at the proximal end 131 of the base 120. The distal end 133a of drain conduit 132 is preferably mechanically connected to the distal end 133b of drain conduit 134 by a connecting wall 123 extending between them at the distal end 133 of the base 120. The proximal connecting wall 121 and the distal connecting wall 123 preferably extend vertically and are parallel to each other. The upper surfaces 121a, 123a of the respective connecting walls 121, 123 are also preferably coplanar with the respective upper surfaces 139a, 139b of drain conduits 132, 134. In this way, upper surfaces 139a, 139b of drain conduits 132, 134 and upper surfaces 121a, 123a of the connecting walls 121, 123 can together contact the lower surface of the solution compartment and support the solution compartment 140. The lower surfaces of the drain conduits 132, 134 likewise support the base 120 and the remaining components of the present apparatus 100 on a support surface. In addition to providing balance to the base 120, the use of two drainage conduits has the advantage of providing drainage capacity for the present system 1 in a more compact manner than if a single drain conduit were used, since the diameter of a single conduit with the same volumetric capacity would be larger than either of the conduits 132, 134 used in the preferred embodiment of the base 120 and would also cause the base to be higher.

One or both of the drain conduits 130 include a drain hole 137 in an upper end of the drain conduit 130 through which solution 20 that has been sprayed inside the root compartment 160 can be drained out of the solution compartment 140 and then conducted away from the present unit 100 through piping 330 (shown in FIG. 6). The drain conduits 132, 134 are adapted to receive and be fitted in a fluid tight manner at the openings 135 of each of their proximal ends 131a, 131b and distal ends 133a, 133b with lengths of pipe 330 which conduct drained fluids away from the present unit 100. As can be seen in FIG. 6, the drain conduits 130 and/or supply conduits 122 of a plurality of units 100, such as units 101-104 and 105-108, can advantageously be joined in series to form the present cultivation system 1. Units joined in this manner can conduct drained solution 20 to a common collector for reuse or disposal, and can likewise be joined to a common source of fresh nutrient solution. At least one end of the drain conduits 130 of each set of units 100 would be blocked and sealed. In this embodiment, the units 100 are preferably spaced apart by lengths of pipe 330 at distances sufficient to provide room for the plants carried by each unit 100 to grow.

Figure 7:
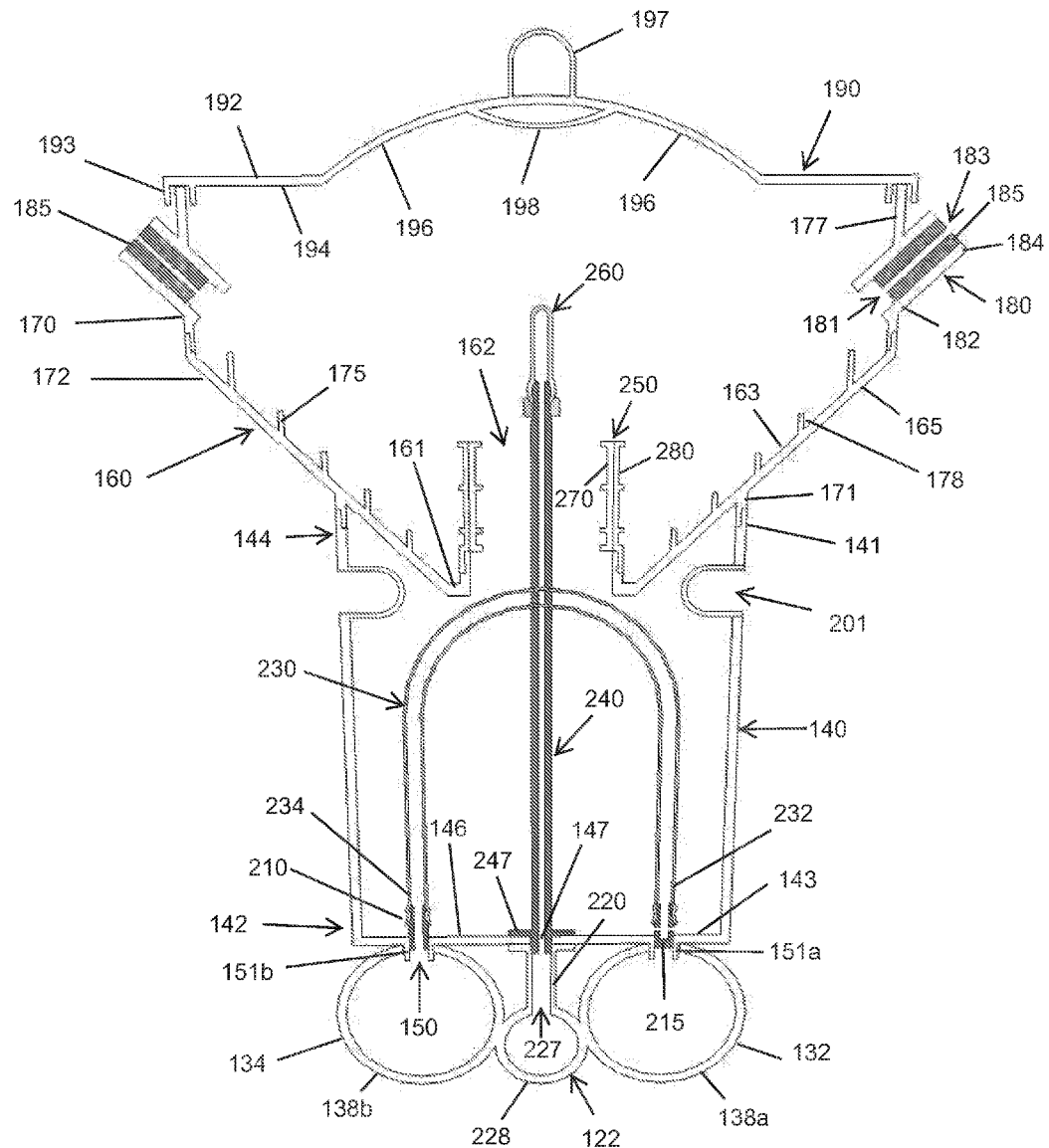
FIG. 7 is a sectional view along line A-A of cultivation unit 103 of FIG. 6.

In addition to providing drainage, the base 120 also preferably supplies solution 20 to the present unit 100 through one or more supply conduits 122. In a preferred embodiment, as shown in FIG. 5, a supply conduit 122 is provided between the two drain conduits 132, 134. In order to provide greater stability to the base 120, the lateral sides of the supply conduit can be attached to the interior sides of the two drain conduits 132, 134, and the lower surfaces 138a, 138b of the drain conduits 132, 134 can be approximately coplanar with the lower surface 228 of the supply conduit 122 (FIG. 7). The connecting walls 121, 123 of the base 120 are also preferably connected and attached to the respective proximal end 126 and distal end of the supply conduit 122.

As with the drain conduits 130, the supply conduit 122 is adapted to receive and be fitted in a fluid tight manner at the openings 135 of its proximal end 126 and distal end with lengths of pipe 340 which conduct solution 20 to the present unit 100. The solution is preferably conducted under pressure, and is conducted into the unit 100 through an opening 227 in the upper end of the supply conduit 122 which connects with or is integrally molded with an outlet pipe 220. The outlet pipe 220 extends upwardly from a proximal end 221 at an upper surface of the supply conduit 122 to an exit opening 229 at a distal (upper) end 223 of the outlet pipe 220.

The solution compartment 140 comprises a compartment for holding the solution 20 which drains from the root compartment 160. The solution compartment 140 is preferably placed on top of the base 120 such that a lower outer surface 141 of the solution compartment 140 contacts the upper surfaces 139a and 139b of the drain conduits 130 and/or the upper surfaces 121a, 123a of the connecting walls 121, 123. As shown in FIG. 5, the exit opening 229 of the supply conduit outlet pipe 220 also preferably comprises a circumferential flange 229a which contacts the lower outer surface 141 of the solution compartment 140, in order to provide a more secure connection between these elements. The solution compartment 140 is connected to the base 120 in the illustrated embodiment by means of a pair of downwardly extending tubular, hollow male connectors 151a, 151b which fit through and connect with the respective drain holes 137 of conduits 132, 134 (as best seen in FIG. 7). The male connectors 151a, 151b each comprise openings 150 which allow the passage of fluids, in particular the solution 20 carried in the solution compartment 140, into the drain conduits 132, 134. Other arrangements also possible, for example the use of male connectors on the upper surfaces 139a and 139b of the drain conduits 130 which extend into the lower end 142 of the solution compartment 140.

The solution compartment 140 generally comprises an upper end 144, a lower end 142, a bottom 146, and an upper opening 145 through which solution 20 drains into the solution compartment 140. The bottom 146 of the solution compartment 140 further includes a lower opening 147 through which the solution 20 enters from the base 120. The lower opening 147 is in communication with the exit opening 229 of the outlet pipe 220 of the supply conduit 122, and each of these is in fluid communication with a riser pipe, best seen in FIG. 9. The threaded male end 246 of the riser conduit 240 helps to connect the solution compartment 140 to the base 120, and a circumferential flange 247 provides support to the riser once it is attached to the solution compartment.

The root compartment 160 in these embodiments comprises vertically extending cylindrical sidewalls 165 and a bottom 161, although other configurations of the root compartment 160 can also be used, such as the use of a frusto-conically shaped compartment or a compartment having a cross-section which is square, rectangular, or another shape. In the illustrated embodiment, the root compartment 160 is composed of two sections, 170 and 172 (see FIG. 4), and has an upper end, lower end, exterior surface, interior surface, upper opening, and lower opening. Upper section 170 is preferably cylindrical, and has a vertically extending side wall 177 which retains stem openings 180. The stem openings 180 preferably extend from the vertically extending side wall 177 at an upwardly acute angle. A lower end of the upper section 170 connects with and preferably attaches to an upper end of the lower section 172, which preferably has a frusto-conical configuration. A downwardly extending circumferential wall 171 has a lower surface which contacts an upper surface 143 at the upper end 144 of the solution compartment 140 in order to support and retain the root compartment on the solution compartment. The upper surface 173 contacts a cover 190 for the root compartment having an upper surface 192 and a lower surface 194. The upper surface includes a handle 197.

The root compartment 160 further includes a sidewall 165 that preferably extends vertically upward and outward from the bottom 161. The sidewall 165 includes one or more stem openings 180, each stem opening 180 having a proximal end 182, a distal end 184, an interior surface 187, and a passage 186 therethrough, the passage 186 having an interior opening 181 in communication with the root compartment 160 and an exterior opening 183 in communication with the exterior. The stem openings 180 preferably extend outwardly from the root compartment 160, preferably from the vertically extending sidewall 177, in order to provide space for stem and leaf growth of a plurality of plants outside the cultivation unit. In the embodiment shown in FIG. 4, for example, four stem openings 180 are provided around a periphery of the vertically extending sidewall 177 of the root compartment 160. The stem openings 180 preferably include a moisture barrier material 185 in contact with the interior surface 187 and also preferably with the stem or trunk of a plant in the present unit 100 in order to retain moisture within the unit 100. The moisture barrier material 185 is also preferably a foam or similarly soft material in order to protect the stems of plants within the stem openings 180 from damage if jarred or moved by the wind, for example.

Figure 13:
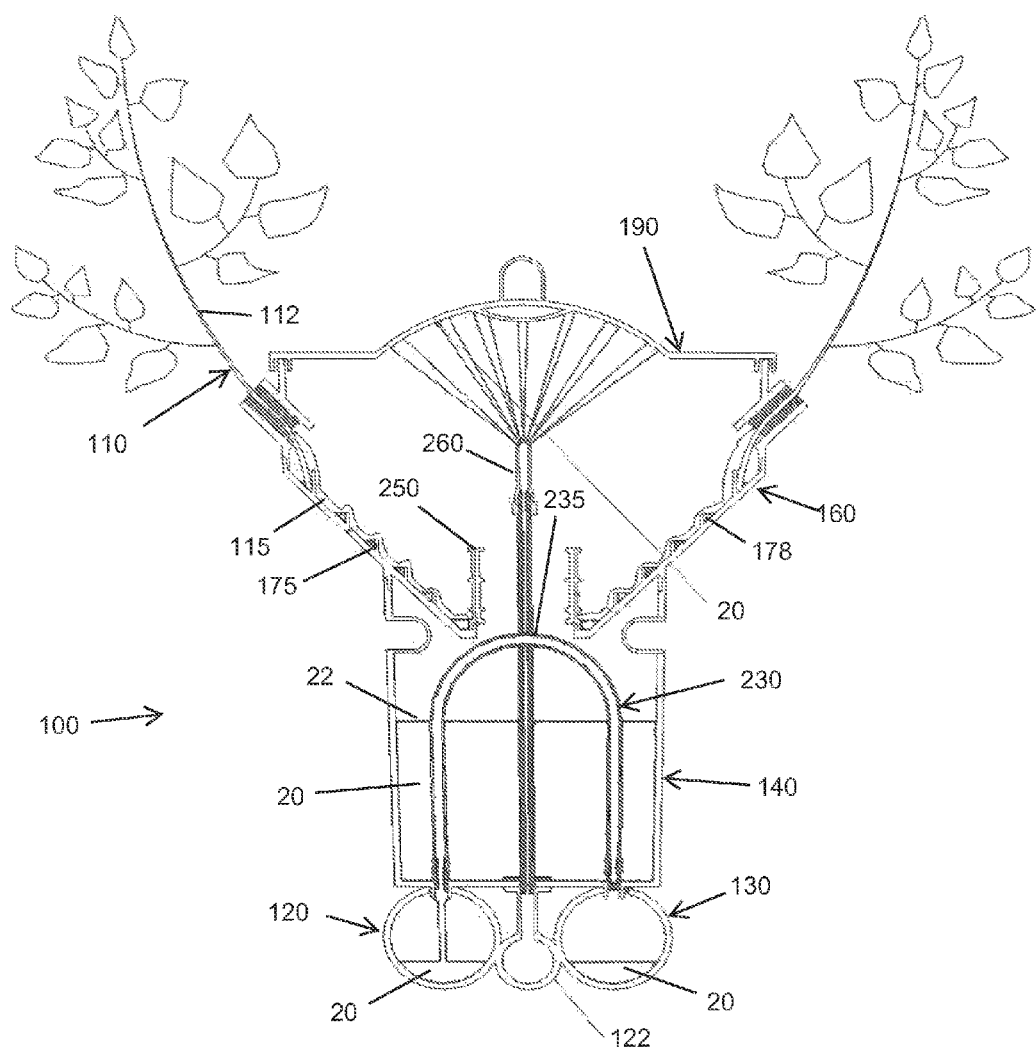
FIG. 13 is a sectional view of cultivation unit 102 of FIG. 6 taken along line B-B.
Figure 14:
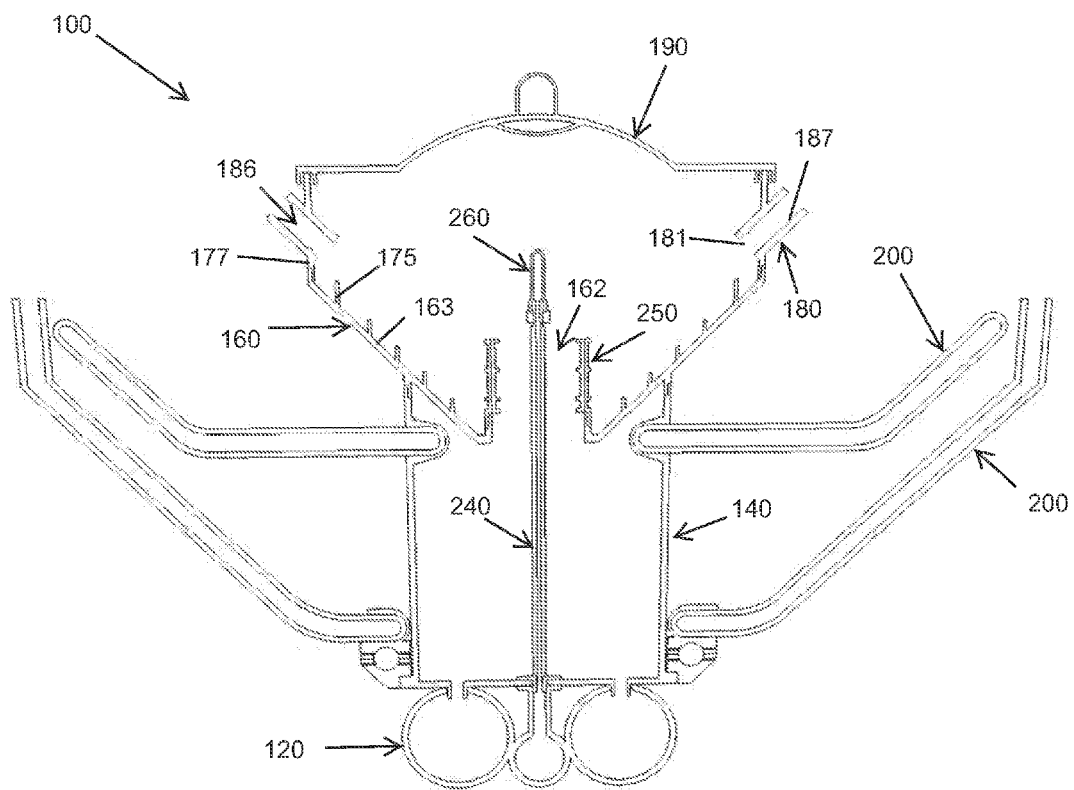
FIG. 14 is a sectional view of the cultivation unit of FIG. 15 along line C-C, showing support arms connected to the unit.
Figure 15:
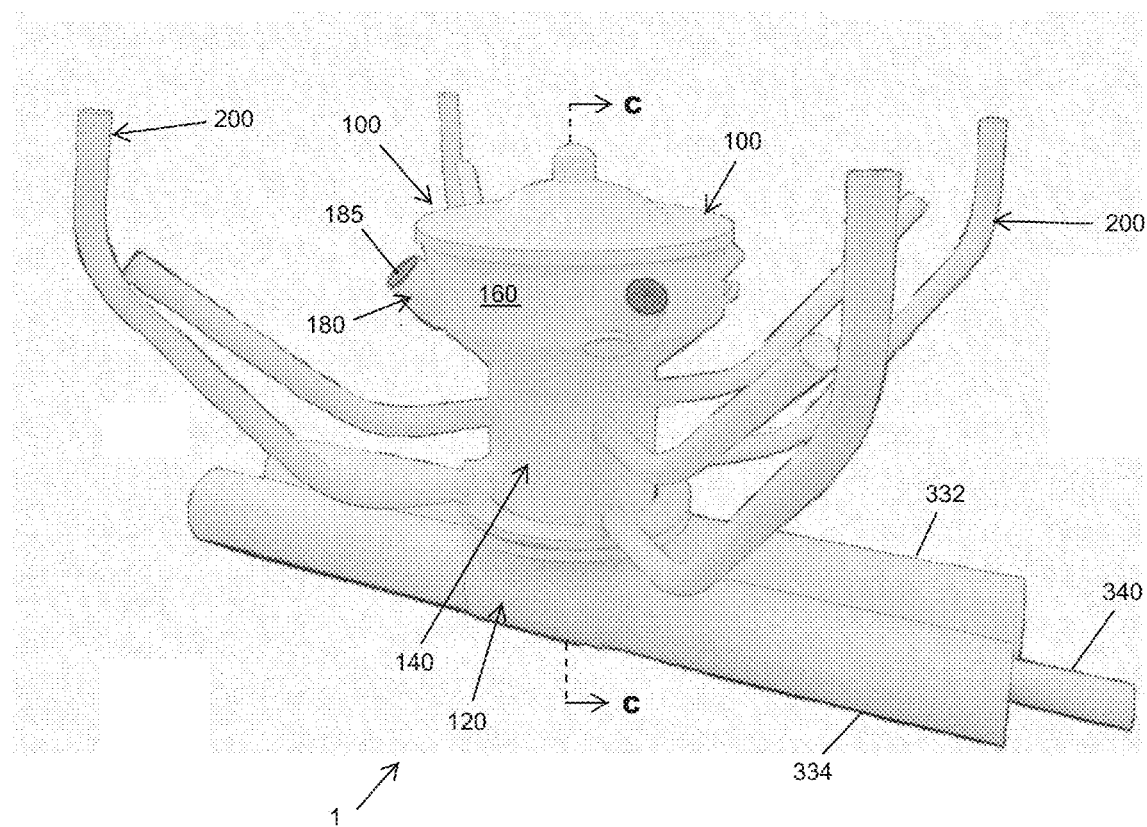
FIG. 15 is a perspective view of the cultivation unit of FIG. 4, showing support arms connected to the unit.

The sidewall 165 of the root compartment 160 further preferably includes one or more circumferential walls 175 extending upwardly from the interior surface 163 of the root compartment 160. These walls 175 preferably extend circumferentially around the interior of the root compartment 160 in a terraced fashion and retain some of the solution 20 sprayed onto the roots in addition to providing space to accommodate growing roots, in order to maintain a constant source of solution for the plants. As seen in FIG. 13, roots 115 of a cultivated plant 110 in the present cultivation unit 100 can be physically supported by the interior surface 163 of the root compartment 160, and can be in more frequent (or constant) contact with a nutrient solution retained in channels 178 formed by the interior surface 163 and the walls 175, in contrast to conventional aeroponic systems.

At the bottom of the root compartment 160 and surrounding a lower opening 162 of the root compartment is a filter 250. The filter is preferably tubular in shape and extends upwardly from the bottom 161 of the root compartment 160, so that solution which drains to the bottom 161 of the root compartment 160 flows through the filter 250 before it enters the solution compartment 140 through the lower opening 162. In this way, the solution 20 which drains into the solution compartment 140 can be kept cleaner, since it is intended to be recirculated after being applied to the roots. In the embodiment shown in FIGS. 4-15, and in particular FIGS. 10-12, the filter comprises an inner piece 270 and an outer piece 280. The inner piece 270 comprises a plurality of vertically oriented flanges 275 extending between an upper end 274 and a lower end 272 around its outer periphery, with each flange 275 comprising a radially extending portion 275a which extends radially away from the center of the filter, and a medial portion 275b at the radially distal end of the radially extending portion 275a, the medial portion 275b extending perpendicularly to the radially extending portion 275a. The outer piece 280 similarly comprises a plurality of vertically oriented flanges 285 extending between an upper end 284 and lower end 282 around its inner periphery, each flange 285 comprising a radially extending portion 285a which extends radially inwardly (toward the center of the filter 250), and a medial portion 285b at the radially distal end of the radially extending portion 285a, the medial portion 285b extending perpendicularly to the radially extending portion 285a. The inner piece 270 fits within the outer piece 280 such that when the inner piece 270 is placed above or below the outer piece 280 and then urged into the outer piece 280, a lower (inward facing) surface 277 of the medial portion 275b of the flange of the inner piece faces a lower (outward facing) surface 288 of the medial portion 285b of the flange of the outer piece, leaving a gap between the flanges of between 10 and 20 microns to allow a flow of solution therethrough. More preferably the gap is between 12 and 20 microns. This gap is large enough to allow fluid flow around and through the flanges of the filter, but to prevent the intrusion of roots. Other filter designs can of course be used, though it is preferred that the openings provided in such filters have a width or diameter on the order of between 10 and 20 microns.

Figure 8:
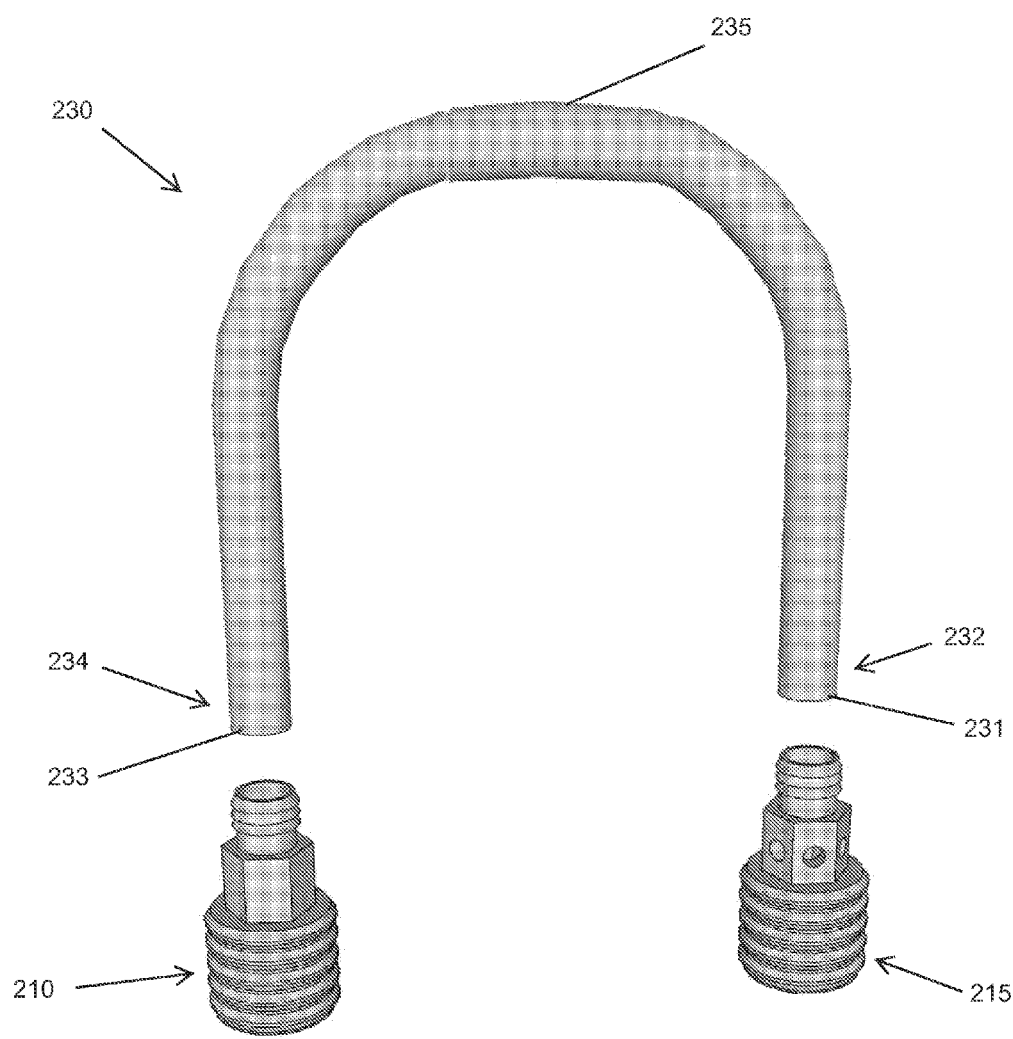
FIG. 8 is a perspective view of the drain conduit used in the embodiment of FIG. 4.
Figure 9:
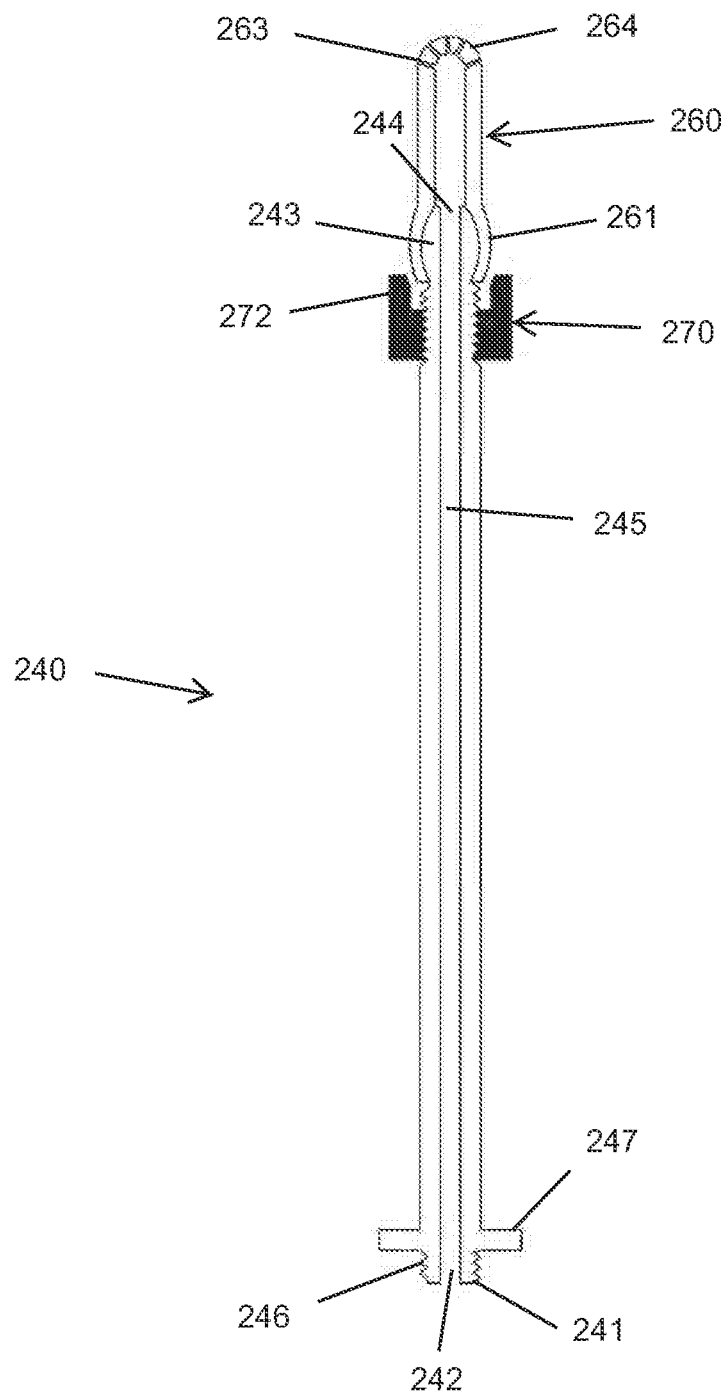
FIG. 9 is a sectional view of the vertical riser pipe and nozzle used in the embodiment of FIG. 4.
Figure 10:
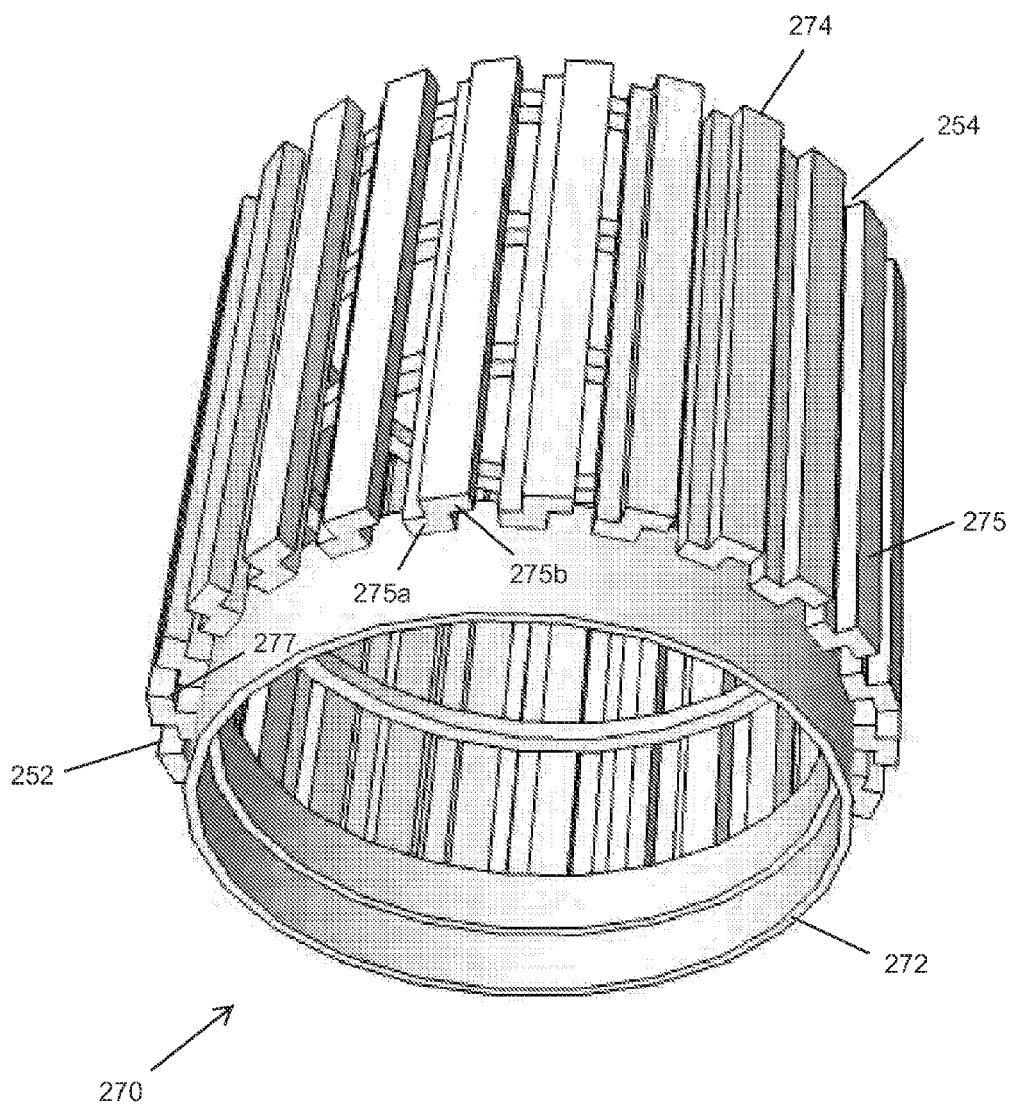
FIG. 10 is a perspective view of one component of the filter used in the embodiment of FIG. 4.
Figure 11:
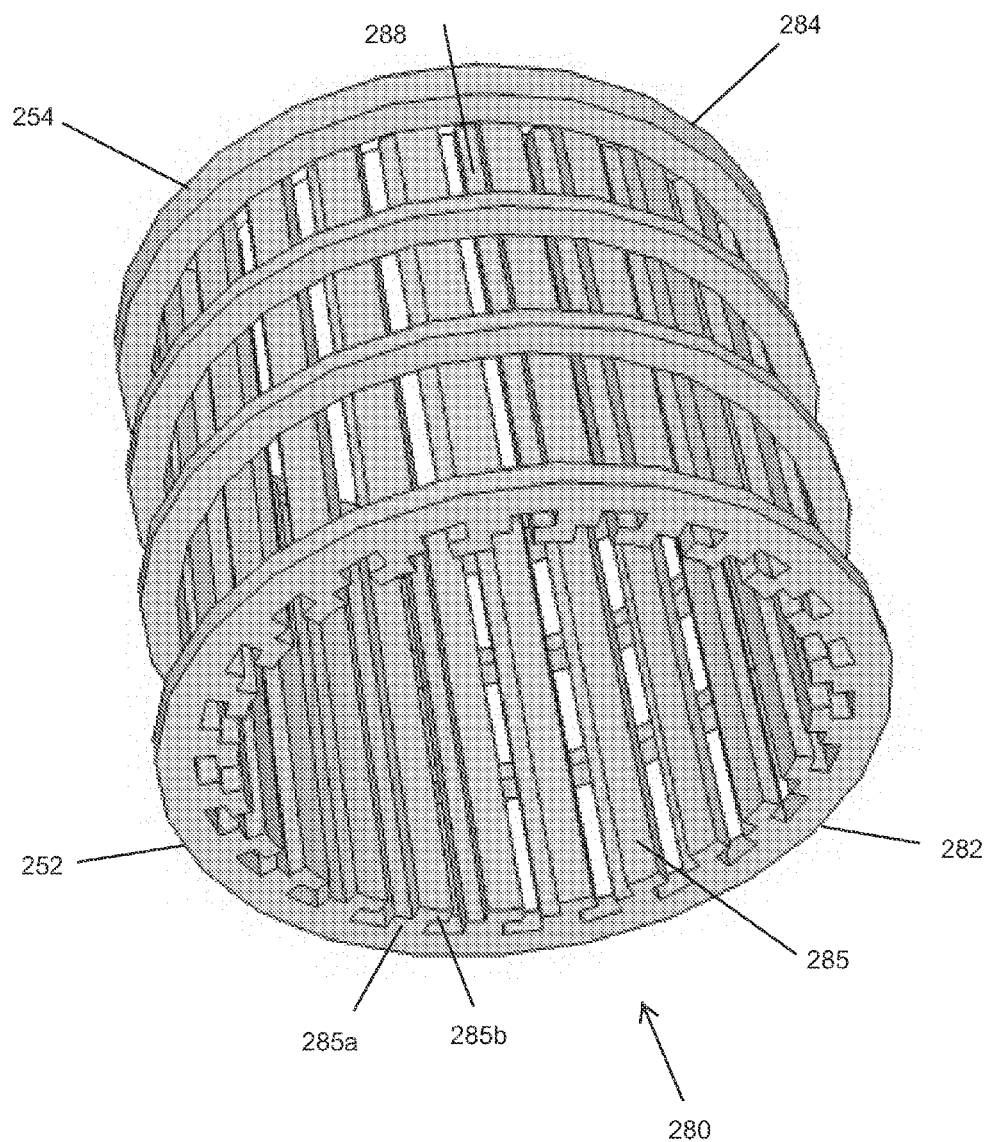
FIG. 11 is a perspective view of another component of the filter used in the embodiment of FIG. 4.
Figure 12:
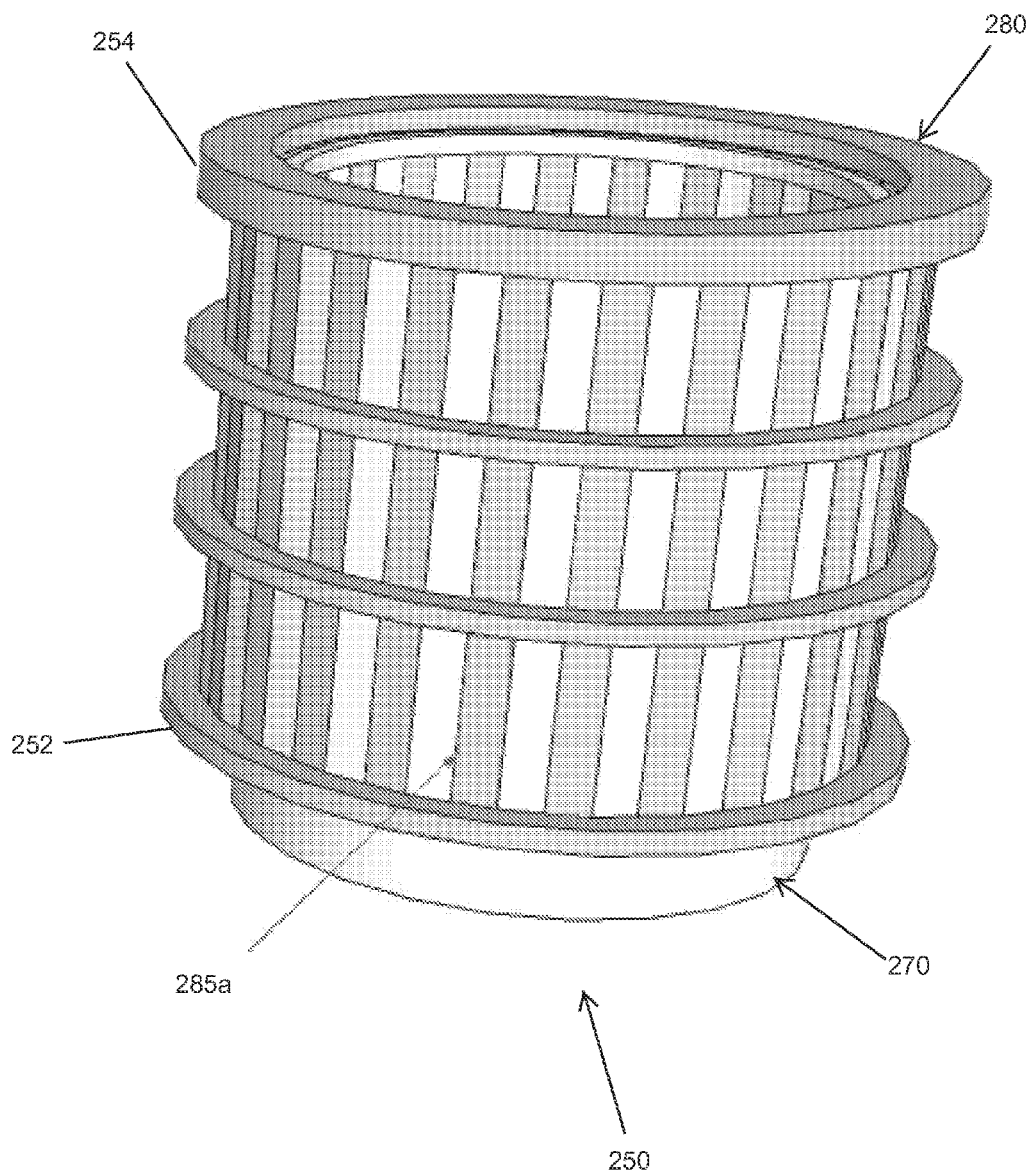
FIG. 12 is a perspective view of the filter used in the embodiment of FIG. 4.

Fluid in the solution compartment 140 is preferably drained using a drain conduit 230 having a proximal end 232 and a distal end 234. After contacting and/or condensing on the roots of plants in this embodiment of the cultivation unit 100, the nutrient solution then drips or drains back into the solution compartment 140 through the filter 250. After, e.g., 3-4 applications of the nutrient solution, the solution level in the solution compartment 140 increases and triggers an overflow system when the upper surface 22 of the solution in the solution compartment reaches the apex 235 of the drain conduit 230. When the fluid level 22 (see FIG. 13) of the nutrient solution 20 is below the apex 235 of the drain conduit 230, the nutrient solution 20 will remain in the solution compartment 140 and will not drain out of the solution compartment 140 through the outlet 233 in the distal end 234 of the drain conduit 230 (FIG. 8). However, when the fluid level 22 reaches the apex 235 of the fluid conduit 230, the nutrient solution 20 will flow through the inlet 231 of the drain conduit 230 and then will drain through the outlet 233, through the connector 210 and into drain conduit 134. The solution is abruptly discharged into the drainage conduit 230, while simultaneously causing air to be sucked out of the root compartment 160 through the filter, away from the roots. This allows fresh air to be supplied through the cover 190, allowing plant roots to be regularly supplied with nutrients and oxygen.

The roots of a plant in the root chamber will thereby be prevented from becoming submerged in the nutrient solution, thus preventing root rot. The drained fluid can be recirculated by being pumped back into the root compartment 160 through the supply conduit 122.

One advantage of the present system is that the units 100 can be attached to drain conduits 130 in such a manner that every other unit connected in series (e.g., units 101 and 103, or 102 and 104 in FIG. 6) drains into an alternating drain conduit (132 or 134). In this way, each of the drain conduits 130 and the drain piping to which it is connected (pipes 332 and 334, FIG. 6) will conduct half of the draining solution of the system.

As in the earlier described embodiment of the present cultivation unit 5, in this embodiment 100 a pump preferably delivers nutrient solution through a fluid supply conduit 122 to an inlet 242 of a riser conduit 240 which transports the solution from the fluid supply conduit 122 to the interior of the root chamber 160. The outlet 244 of the riser conduit 240 delivers the solution as a spray or mist, which is then delivered to the roots 115 on the interior of the root chamber 160. In the embodiment of FIGS. 4-15, the nutrient solution can be delivered as a spray or mist generated by pumping solution 20 through outlet holes 264 of a nozzle 260 attached to the distal end 243 of the riser 240. The nozzle 260 is preferably formed from an elastic material, and is retained on the riser by placing a proximal end 261 over the distal end 243 of the riser. Alternatively, the nozzle can be integrally formed with the riser 240. Below the distal end 243 a connector 270 having threads is preferably engaged on grooves of the riser 240, and this connector 270 is screwed upward until the inner surface of upwardly extending walls 272 of the connector 270 engage the outer surface of the proximal end 261 of the nozzle 260. The riser 260 is preferably attached at proximal end 241 to the lower opening 147 at the bottom 146 of the solution container 140 in order to place it in fluid communication with the exit pipe 220 and the supply conduit 122.

The cover 190 (best seen in FIGS. 4 and 7) generally comprises an upper surface 192, a lower surface 194, and a rim 193 extending horizontally beyond the width and/or depth of the root compartment in order to retain the cover 190 on top of the root compartment 160. The lower surface of the cover 190 preferably includes a central portion 196 having a concave surface, and a center area 198 of this central portion 196 is preferably convex in shape. As illustrated in FIG. 13, when the solution 20 is sprayed from the nozzle, this configuration of the interior of the cover 190 helps to better distribute the sprayed solution onto the roots of plants in the unit 100.

The components of the base 120, solution compartment 140, and root compartment 160 can be formed from any suitably rigid material which can be formed or constructed to form these components of the present system. In a preferred embodiment, the base 120, solution compartment 140, and root compartment 160 are formed from a suitably rigid polymer material suitable for carrying the solution 20 and supporting growing plants, such as PVC (polyvinyl chloride) or ABS (acrylonitrile butadiene styrene) plastic.

Cultivation

The present cultivation units can be placed in rows in a greenhouse or outside, for example, in order to form the present cultivation system 1. They can be mounted on soil, concrete, or wood, for example, and a pressurized fluid supply line and drainage line can be installed through all the cultivation units 1. Seedlings with an open root system are placed in the root compartment 160 and are preferably provided with a nutrient solution cyclically around the clock. For example, the solution can be sprayed at a rate of 1 quart/liter in one minute, followed by a pause of 15 minutes, to provide 4 one minute feedings per hour. Nitrifying and other types of bacteria are preferably included in the growing solution, such as commercially available EM-1 compositions. They grow quickly and play a very positive role in plant development, and are particularly important in closed circuit feed systems.

Preferably, the present cultivation unit 100 supports between 1 and 4 stems extending outside the root compartment 160. The upper end of the stem 112, i.e. the portion extending to the crown of the plant, extends outside the cultivation unit 100 through the stem opening 180, while roots 115 (see FIG. 13). When tomato plants are grown, the stems are preferably trained in an upward, braided manner. Rigid stem supports 200 placed in slots 201 in the solution container 140, shown for example in FIGS. 14 and 15, can help to support the stems of the plants. A variety of plants can be grown using the present cultivation units 100 and system 1.

Although tomato plants are generally grown commercially as an annual plant, with the present cultivation unit 100, tomatoes, chamomile, and other plants can be rejuvenated at the end of their producing cycle. This is accomplished by cutting a portion of the stem of the plant outside the root chamber 160, removing the roots and remaining stem from the root chamber 160, and then the placing the cut stem portion into the root chamber 10. After 2 to 4 weeks, the cut stem portion will grow roots and begin growing as a new producing plant.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety, including U.S. patent application Ser. No. 13/710, 446, filed Dec. 10, 2012 and U.S. Patent Application No. 61/568,873, filed Dec. 9, 2011, from which the present application claim priority.

What is claimed is:

1. A cultivation unit for growing plants, comprising:
   (a) a base, the base comprising:
      (i) a pair of drain conduits, each conduit having a proximal end, a distal end, an upper surface, a lower surface, a medial side, a lateral side, and a drain hole in an upper surface of the drain conduit, the drain hole being in communication with an interior of the drain conduit; and
      (ii) a supply conduit, the supply conduit having a proximal end, a distal end, an upper surface, a lower surface, and two lateral sides, and an outlet;
   (b) a solution compartment positioned above the base, the solution compartment comprising an upper end, a lower end, an exterior surface, an interior surface, vertically extending sidewalls, an upper opening, and a bottom, the bottom comprising at least one outlet in communication with one of the pair of drain conduits and an inlet in communication with the outlet of the supply conduit;
   (c) an interior drain pipe having a proximal end, a distal end, and a medial portion disposed above the proximal end and the distal end, the medial portion comprising a vertex, the proximal end and distal end having fluid openings, the proximal end being in fluid tight engagement with the drain hole of the drain conduit, wherein the distal end of the drain pipe is disposed higher than the proximal end, and wherein the medial portion of the drain pipe is disposed higher than the proximal and distal ends, so that fluid from the interior of the solution compartment enters the fluid opening in the distal end of the drain pipe and exits through the fluid opening in the proximal end of the drain pipe when an upper surface of a fluid in the solution compartment reaches the vertex of the drain pipe;

(d) a riser pipe having an upper end and a lower end with a lower opening, the lower opening being in fluid communication with the supply conduit, the upper end comprising a nozzle having nozzle openings to allow the passage of fluid therethrough;

(e) a root compartment having an upper end, a lower end, an exterior surface, an interior surface, an upper opening, a lower opening, and a downwardly extending circumferential wall between the upper end and the lower end of the root compartment, wherein the lower end of the root compartment is supported on the upper end of the solution compartment, wherein the circumferential wall comprises one or more stem openings, each stem opening having a proximal end, a distal end, an interior surface, and a passage to allow a portion of a plant being grown in the compartment to pass therethrough;

(f) a cover for the root compartment having an upper surface and a lower surface, the cover contacting the upper end of the root compartment; and (g) a filter attached to the lower opening of the root compartment, the filter having an upper end, a lower end, and circumferential walls extending from the lower end to the upper end, wherein the filter walls comprise openings to allow the passage of fluid therethrough, such that fluid in the lower end of the root compartment drains into the solution compartment through the filter.

2. The cultivation unit of claim 1, wherein the supply conduit is positioned between the pair of drain conduits and each lateral side of the supply conduit is attached to a respective medial side of one of the drain conduits.

3. The cultivation unit of claim 1, wherein the base further comprises at least one connecting wall extending between the pair of drain conduits and attached to the outer surface of the supply conduit.

4. The cultivation unit of claim 1, wherein the outlet of the solution compartment comprises a downwardly extending, hollow, male connector adapted to fit into the drain holes of the base, thereby securing the solution to the base and allowing for fluid communication between the interior of the solution compartment and the interior of each of the drain conduits.

5. The cultivation unit of claim 1, wherein the bottom of the solution compartment comprises two outlets, one outlet in communication with each of the pair of drain conduits, wherein a plug is fitted into one of the outlets in order to prevent the passage of fluid from the solution compartment.

6. The cultivation unit of claim 1, wherein the sidewalls of the solution compartment further comprise one or more sockets for receiving outwardly extending supports for supporting the exterior portions of plants being grown in the cultivation unit.

7. The cultivation unit of claim 1, wherein the lower end of the riser pipe comprises threads for engagement with corresponding grooves in the supply opening of the solution compartment and/or in the exit opening of the supply conduit, and wherein the lower end of the riser pipe is connected to the solution compartment and/or the exit opening of the supply conduit by threaded engagement, thereby securing the riser pipe and placing the riser pipe in fluid communication with the supply conduit.

8. The cultivation unit of claim 1, wherein the upper end of the riser pipe comprises an upper opening adapted to engage an opening of a nozzle.

9. The cultivation unit of claim 1, wherein the sidewall of the root compartment extends vertically upward and outward from the lower end of the root compartment.

10. The cultivation unit of claim 1, wherein the root compartment further comprises one or more circumferential walls extending upwardly from the interior surface of the root compartment and having an upper end and a lower end, the circumferential walls providing support for roots growing within the root compartment.

11. The cultivation unit of claim 1, wherein the stem opening further including a moisture barrier material in contact with the interior surface of the stem opening.

12. The cultivation unit of claim 1, wherein a central portion of the lower surface of the cover has a concave shape.

13. The cultivation unit of claim 1, wherein the upper end of the riser pipe extends through the lower opening of the root compartment and into the interior of the root compartment.

14. The cultivation unit of claim 1, wherein the filter is tubular in shape.

15. The cultivation unit of claim 1, wherein the filter walls comprise openings having a width of between 10 and 20 microns to allow a flow of solution therethrough.

16. The cultivation unit of claim 1, wherein the filter comprises:
(a) an inner piece comprising a plurality of vertically oriented flanges extending between the upper end of the filter and the lower end of the filter around its periphery, each flange comprising:
(i) a radially extending portion which extends radially away from the center of the filter, and
(ii) a medial portion at the radially distal end of the radially extending portion, the medial portion extending perpendicularly to the radially extending portion,
(b) an outer piece comprising a plurality of vertically oriented flanges extending between the upper end of the filter and the lower end of the filter around its periphery, each flange comprising:
(i) a radially extending portion which extends radially toward the center of the filter, and
(ii) a medial portion at the radially distal end of the radially extending portion, the medial portion extending perpendicularly to the radially extending portion,
wherein the inner piece fits within the outer piece such that a lower surface of the medial portion of the flange of the inner piece faces a lower surface of the medial portion of the flange of the outer piece, leaving a gap between the flanges of between 10 and 20 microns to allow a flow of solution therethrough.

17. A cultivation system comprising:
a first cultivation unit according to claim 1, wherein each of the pair of drain conduits is attached at its distal end to a respective drain pipe at a proximal end of the drain pipe, and wherein the distal end of the supply conduit is attached to a supply pipe at a proximal end of the supply pipe; and
a second cultivation unit according to claim 1, wherein each of the pair of drain conduits is attached at its proximal end to a respective drain pipe at a distal end of the drain pipe, and wherein the proximal end of the supply conduit is attached to a supply pipe at a distal end of the supply pipe.

* * * * *